June 25, 1935. W. W. OSLUND 2,005,802
LABELING MACHINE
Original Filed Feb. 6, 1933 5 Sheets-Sheet 1
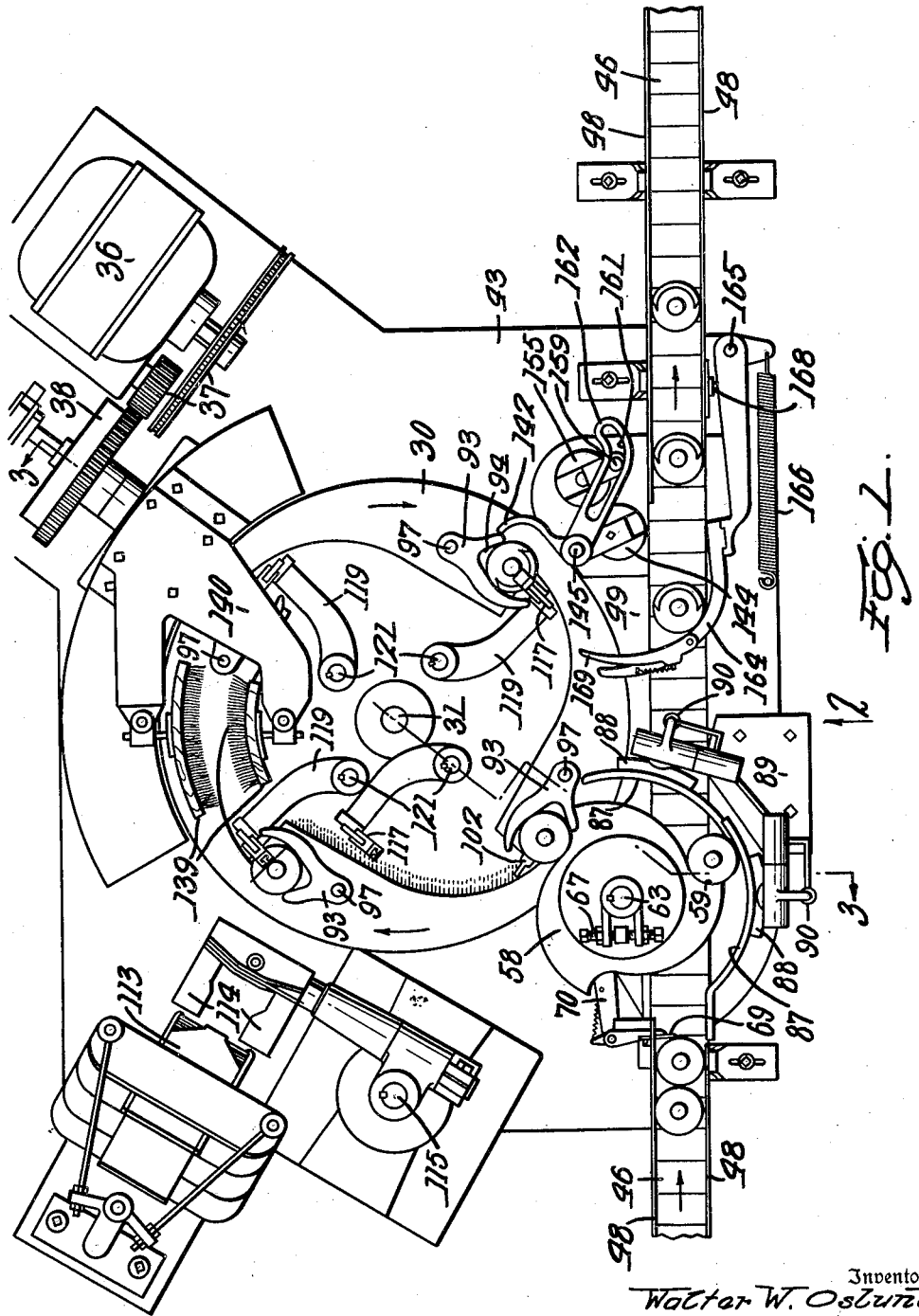
Inventor
Walter W. Oslund
By
Albert G. Blodgett
Attorney June 25, 1935. W. W. OSLUND 2,005,802
LABELING MACHINE
Original Filed Feb. 6, 1933 5 Sheets-Sheet 2
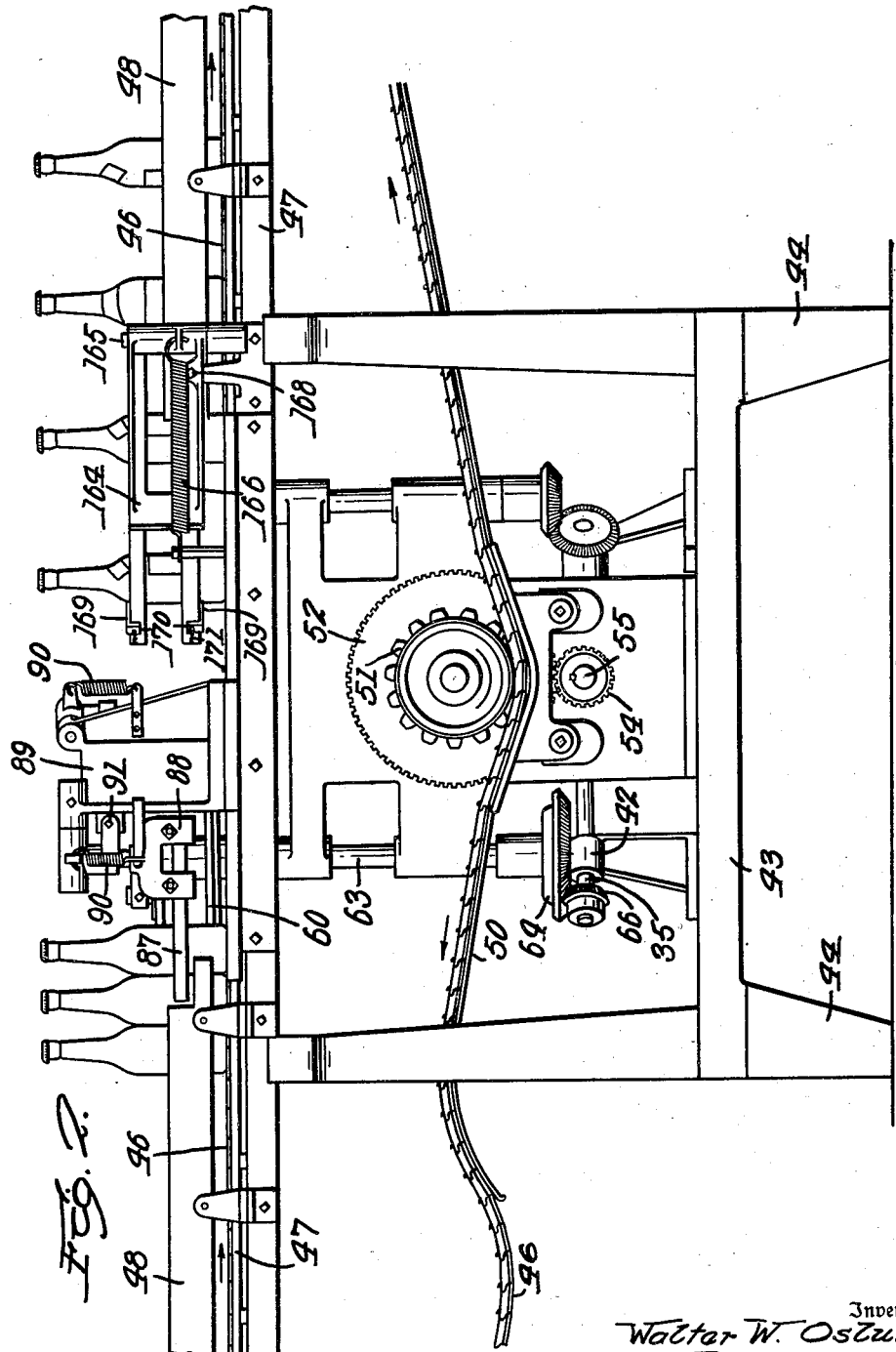

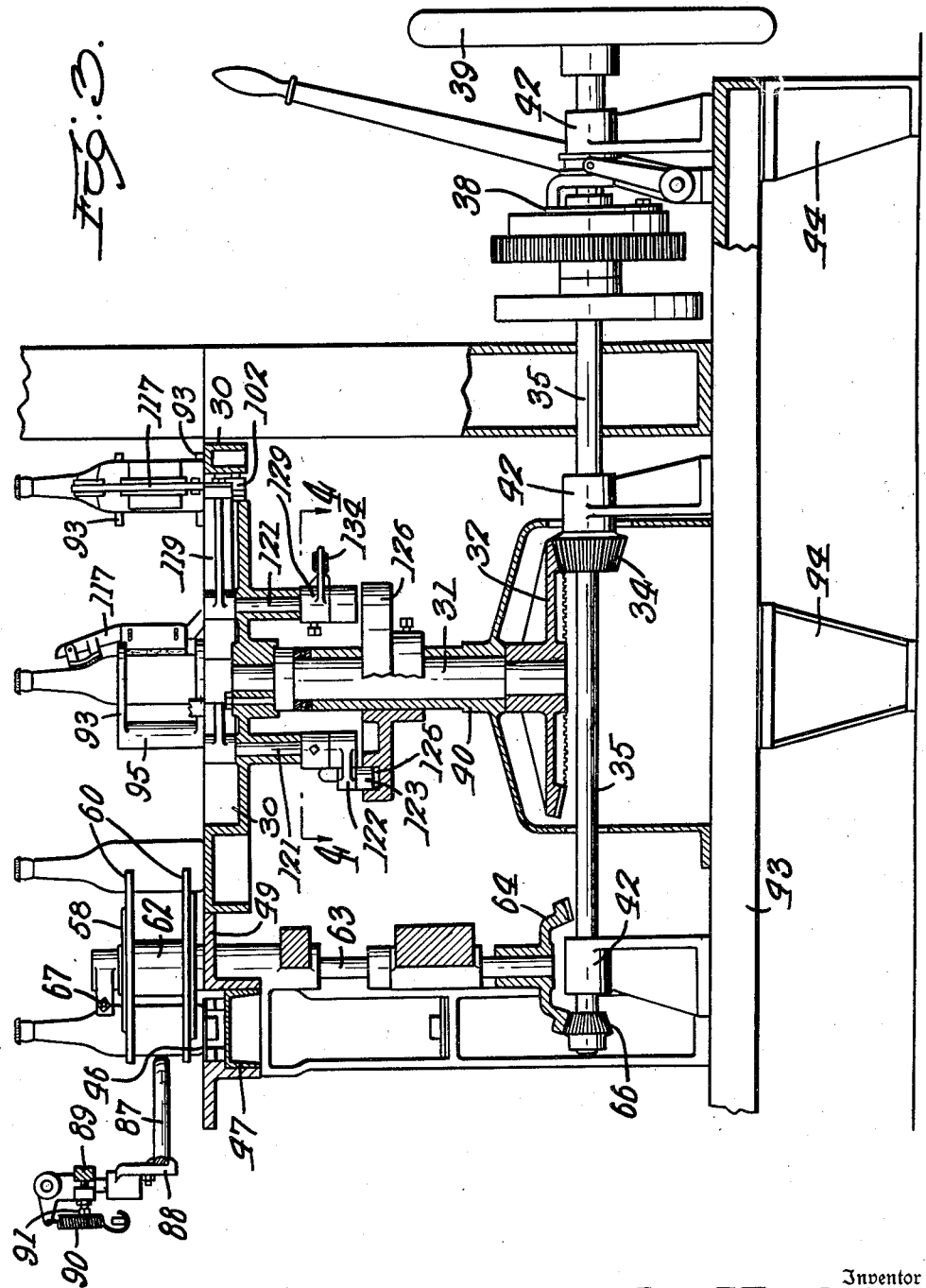

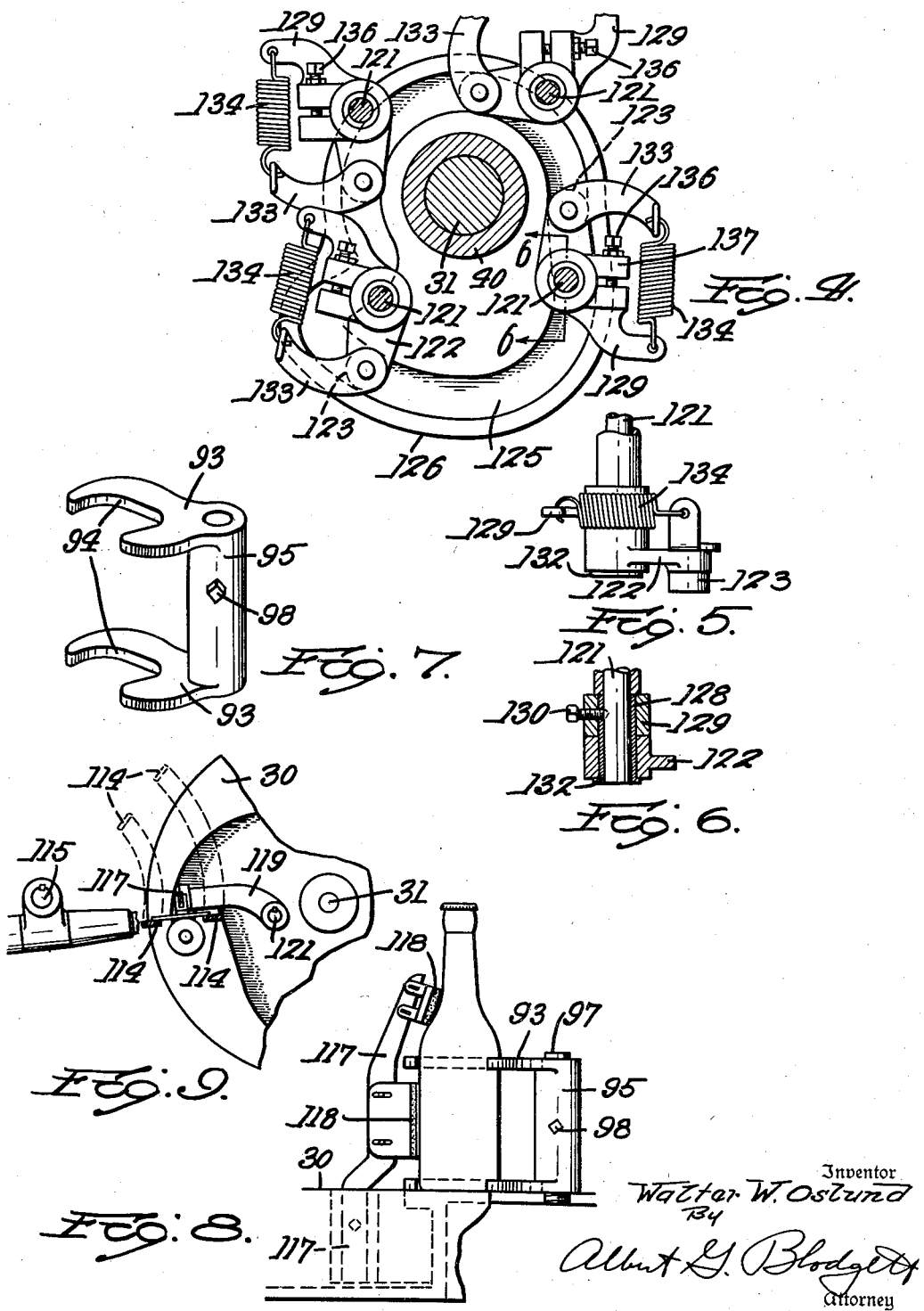

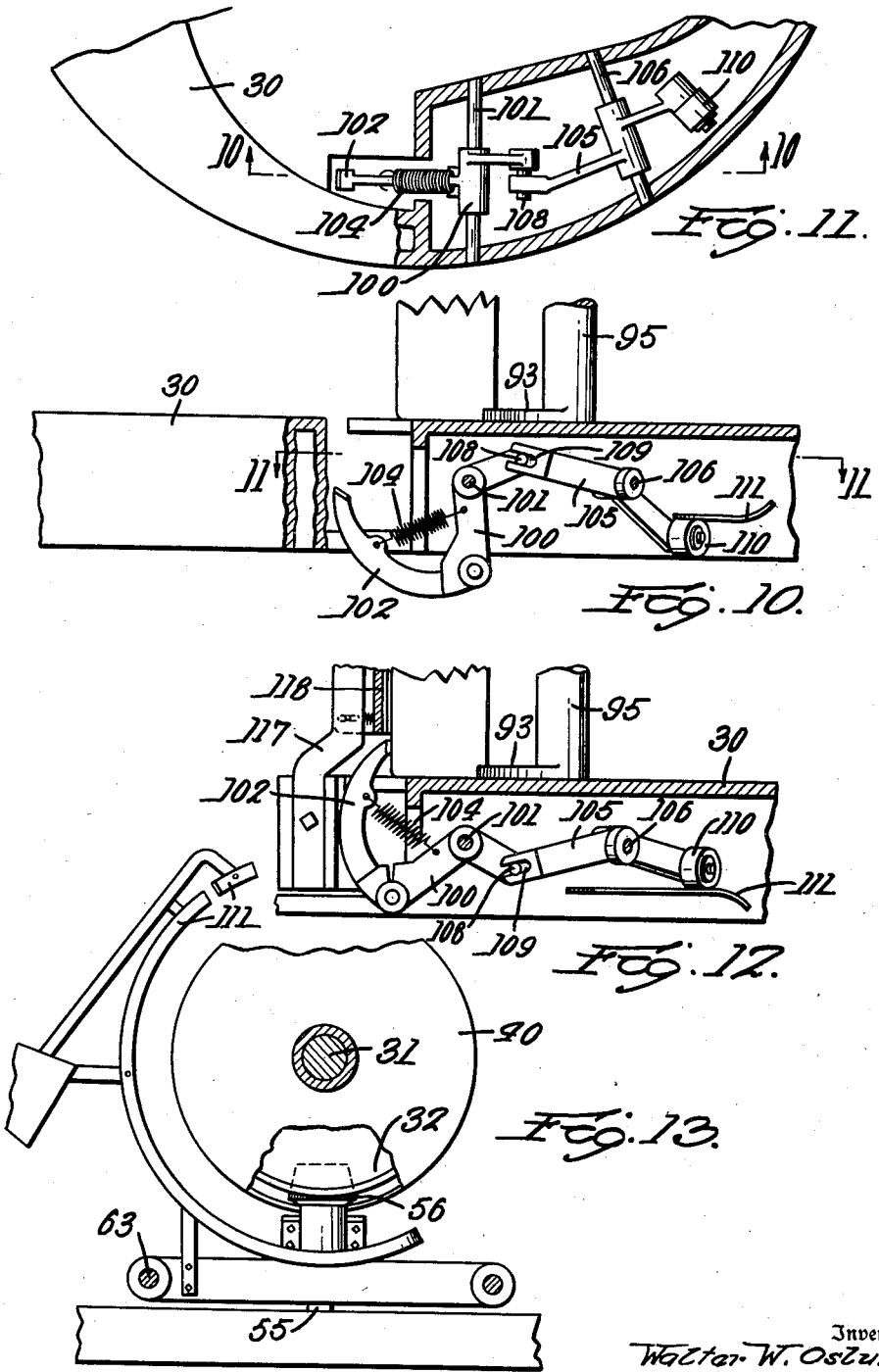

Patented June 25, 1935

2,005,802

UNITED STATES PATENT OFFICE 2,005,802

LABELING MACHINE

Walter W. Oslund, Holden, Mass., assignor to The Oslund Brothers Machine Company, Incorporated, Holden, Mass., a corporation of Massachusetts Original application February 6, 1933, Serial No. 655,401. Divided and this application June 16, 1933, Serial No. 676,066

5 Claims. (Cl. 216—59)

This invention relates to labeling machines, and more particularly to a machine arranged to affix labels to articles such as glass bottles automatically and at a high rate of speed. This application is a division of my prior application Serial No. 655,401, filed February 6, 1933.

Bottle labeling machines ordinarily comprise a rotary table on which the bottles are supported during the labeling operation. A feeding device receives the bottles from a traveling conveyor and places them on the table, and an additional mechanism transfers the labeled bottles from the table back to the conveyor. Prior machines in this art have been complicated and expensive, and they have been subject to certain difficulties in operation. The bottles are not always held firmly throughout all parts of the cycle, and as a result breakage of bottles frequently occurs, particularly when the machine is stopped suddenly. The broken pieces of glass often fall through openings provided in the table and thus reach the cams and other mechanism therebeneath. The brackets which support the bottles on the table frequently interfere with the label wiping mechanism, particularly when the labels completely surround the bottles.

It is accordingly one object of the invention to provide a comparatively simple and inexpensive machine which is capable of affixing labels at a very high rate of speed, and which will operate for long periods without attention or repair.

It is a further object of the invention to provide a labeling machine which will hold the bottles or other articles firmly throughout the entire cycle of operation and thus prevent breakage of the articles caused by sudden stopping of the machine.

It is a further object of the invention to provide a labeling machine which is so constructed and arranged that if a bottle should break, the broken pieces cannot fall into the cams and other mechanisms beneath the table.

It is a further object of the invention to provide a bracket for supporting the articles on the table of a labeling machine which is so constructed that the articles will be firmly supported during the entire operation.

It is a further object of the invention to provide a bracket for supporting glass bottles on the table of a labeling machine which is so constructed as not to interfere with the affixing of labels around the entire circumference of the bottles.

With these and other objects in view, as will be apparent to those skilled in the art, the invention resides in the combination of parts set forth in the specification and covered by the claims appended hereto.

Referring to the drawings illustrating one embodiment of the invention, and in which like reference numerals indicate like parts, Fig. 1 is a top plan view of a bottle labeling machine;

Fig. 2 is a front elevation of the machine, with certain parts omitted for clearness of illustration;

Fig. 3 is a section on the line 3—3 of Fig. 1;

Fig. 4 is a section on the line 4—4 of Fig. 3;

Fig. 5 is a detail of the actuating mechanism for one of the label grippers;

Fig. 6 is a section on the line 6—6 of Fig. 4;

Fig. 7 is a perspective view of a bottle supporting bracket;

Fig. 8 is an elevation showing one of the label grippers in operating position;

Fig. 9 is a plan view showing the position of the parts when the label is first brought into contact with the bottle;

Fig. 10 is a section taken approximately on the line 10—10 of Fig. 11, showing a bottle clamp and the actuating mechanism therefor;

Fig. 11 is a section on the line 11—11 of Fig. 10;

Fig. 12 is a view similar to Fig. 10, but showing the parts in the clamping position; and Fig. 13 is a plan view of the cams which control the clamping mechanism.

In the drawings I have shown a machine particularly suitable for affixing labels to glass bottles, but it will be apparent to those skilled in the art that certain features of the invention can be used advantageously in connection with labeling machines in general.

The embodiment illustrated comprises a circular table 30 which is arranged to be rotated in a clockwise direction as viewed in Fig. 1. The table is driven by means of a vertical shaft 31 therebeneath which is provided at its lower end with a large bevel gear 32 (Fig. 3). A bevel pinion 34, which is mounted on a horizontal shaft 35, meshes with the gear 32 to drive the same. The shaft 35 is driven by an electric motor 36 (Fig. 1) which is connected thereto by a suitable speed reducing mechanism 37. As is usual in machines of this type, I have provided a clutch 38 (Fig. 3) which will permit the driving motor to be disconnected from the shaft 35, whereupon the shaft may be rotated manually by means of a handwheel 39. By turning the machine over slowly in this way, any necessary adjustments in the various parts can be made more accurately. The vertical shaft 31 is shown journaled in a stand or bracket 40 (Fig. 3), and the horizontal shaft 35 is mounted in bearings 42. The stand 40 and bearings 42 are supported on a horizontal base 43 provided with feet 44.

The unlabeled bottles are delivered to the machine and the labeled bottles delivered therefrom by the usual endless conveyor chain 46. A suitable track 47 serves to support the top run of the chain in a horizontal plane level with the top of the table 30, the usual guide rails 48 being provided at each side of the track to keep the bottles thereon. A flat horizontal shelf 49 is provided between the chain and the table even with the top thereof. The lower run of the chain is supported by a track 50 (Fig. 2) and driven by means of a sprocket 51 which is driven by means of a spur gear 52 coaxial therewith. A spur pinion 54 meshes with the gear 52, this pinion being mounted on the outer end of a shaft 55 which carries on its inner end a bevel pinion 56 (Fig. 13) driven from the large bevel gear 32.

In order to transfer the unlabeled bottles from the conveyor chain 46 to the table 30, I utilize a feeding turret 58 which is rotated about a vertical axis in a counter-clockwise direction as viewed in Fig. 1. This turret is provided with a plurality of bottle-engaging hooks or abutments 59 which are equally spaced about its circumference, there being three of these hooks in the illustrated embodiment. As shown particularly in Fig. 3, the turret comprises two vertically spaced horizontal flanges 60 (which are shaped to provide the hooks 59), these flanges being connected by a central hub 62. The turret is mounted on the upper end of a vertical shaft 63 provided with a bevel gear 64 at its lower end. This gear is driven by means of a bevel pinion 66 mounted on the end of the horizontal shaft 35, which is extended for this purpose. A suitable adjusting means 67 (Fig. 1) is preferably provided so that the angular relationship of the turret to the shaft 63 may be altered slightly if necessary to produce the desired operation. It will be noted that the shaft 63 is positioned between the conveyor chain 46 and the table 30, and the turret extends over the chain in a position to receive the bottles carried thereby.

In order to synchronize the delivery of the bottles to the turret and the successive arrival of the hooks 59 to the bottle receiving position, I provide a stop 69 which is movable into and out of the path of the bottles carried by the chain 46. This stop is mounted on the end of a lever 70 which is actuated automatically by a mechanism described and claimed in my said prior application Serial No. 655,401.

As soon as a bottle is engaged by one of the hooks 59 it is carried around thereby and placed upon the table 30. During this movement the bottles are supported and held against the turret 58 by means of two arcuate guide rails 87 arranged substantially concentric with the turret. These guide rails are yieldably urged toward the turret, and since each rail contacts with only one bottle at a time the bottles are firmly held. In the preferred construction each guide rail 87 is suspended by means of an arm 88 (Fig. 2), and the upper end of each arm is pivoted to a bracket 89. The pivotal axes are horizontal and perpendicular to radii leading to the central portions of the guide rails, as shown particularly in Fig. 1, so that the rails may swing directly toward the turret. They are urged in that direction by tension springs 90 (Fig. 2) which connect projections on the arms 88 with projections on the bracket 89. The movement of the rails is limited by adjustable screws 91.

As soon as each bottle is placed on the table 30 by the rotating turret, it is engaged by a bottle supporting bracket 93 mounted on the upper surface of the table and near the outer edge thereof. There are a plurality of these brackets (four being illustrated) equally spaced about the circumference of the table. The speed of the turret 58 is related to the speed of the table in the ratio of the number of brackets to the number of turret hooks 59. With four brackets and three turret hooks, the turret should rotate four times while the table is rotating three times. As shown particularly in Fig. 7, each bracket 93 comprises two vertically spaced double-pronged or V-shaped forks 94, and a connecting portion shown as a vertical post 95. The forks 94 project horizontally from the post in vertical alignment with each other, and the prongs at one side of the forks are considerably longer than the other prongs. Moreover the extremities of these longer prongs preferably curve toward the shorter prongs, for a purpose which will be made apparent later in this description. The brackets 93 are mounted on the table 30 with the forks 94 extending forward in the direction of rotation, and with the longer prongs located on the side toward the center of the table. The forks 94 are so shaped that when the bottle is in position in the forks a considerable space will be allowed between the bottle and the post 95. The advantage of this construction will be explained later herein. The brackets may be held on the table in various ways. In the illustrated embodiment vertical studs 97 extend upwardly from the table, and the posts 95 are made hollow to fit over these studs, set screws 98 being provided to hold the brackets firmly on the studs.

It will now be apparent that after the bottle has entered the forks in the bracket and moved slightly out of contact with the turret, a sudden stopping of the machine will cause the bottle to slide forwardly and perhaps tip over and break. In order to prevent this from happening I have provided the mechanism shown particularly in Figs. 10 to 13, which comprises a lever 100 located beneath each bracket 93 and pivoted to the underside of the table 30 by means of a horizontal pin 101. A gripping device or finger 102 is pivoted to the end of the lever 100, and a tension spring 104 normally holds cooperating shoulders on these parts in contact. When the lever swings to the position shown in Fig. 12, the finger 102 will engage the front surface of the bottle near the bottom thereof and hold it in the bracket, the spring 104 serving to prevent excessive pressure on the bottle and to compensate for variations in bottle size. Each lever 100 is actuated by a second lever 105 pivoted to the table by means of a horizontal pin 106. The adjacent ends of the levers are connected by a pin 108 fixed in the lever 100 and engaging a slot 109 in the lever 105. The other end of the lever 105 carries a cam roller 110 which engages stationary cams 111 shaped to give the desired movement to the fingers 102. In the illustrated construction each finger 102 is arranged to engage the bottle as soon as it is placed in the bracket, and the finger is withdrawn from the bottle immediately after the labels have been applied by the pickers and the label grippers have moved into gripping position.

In some machines it may be desirable to leave the fingers 102 in clamping position for a larger part of the cycle, and this may be easily accomplished by extending the cams 111.

After the continued rotation of the table has carried the bottle a short distance away from the feeding turret, labels from a storage magazine 113 are applied to the bottle by means of movable label pickers 114 (Figs. 1 and 9) which are actuated by a suitable driving mechanism 115. Various constructions for this purpose are known in the art, and no detailed description of these parts will be made herein, since the present invention is concerned with other features of the machine.

As soon as the labels are brought to the bottle by the pickers, label grippers are moved into position to hold the labels against the bottles, whereupon the pickers are withdrawn. Each label gripper, as best shown in Fig. 8, comprises a vertical bar 117 which carries label engaging members 118 provided with label contacting surfaces of sponge rubber or other suitable material. Each bar 117 is mounted on the outer end of a horizontal arm 119 (Fig. 9) which is secured to the upper end of a vertical shaft 121 extending downwardly through the table 30. The central portion of the table, over which the arms 119 swing, is preferably depressed below the outer portion on which the brackets 93 are mounted.

The movements of the label grippers are controlled by the mechanism shown in Figs. 3 to 6 inclusive. This mechanism comprises a horizontal arm 122 mounted on the lower end of each shaft 121. Each arm 122 carries on its outer end a cam roller 123 which operates in the groove 125 in a stationary face cam 126 mounted on the central stand 40 beneath the table. This cam groove 125 is so shaped that the instant the labels are brought into contact with the bottle by the pickers, the shaft 121 will be turned to swing the label gripper into contact with the labels between the pickers. The label gripper remains in this relative position until the bottle reaches the position where it is to be removed from the table. It will be noted that the label grippers thus serve the dual purpose of holding the labels against the bottles, and clamping the bottles in the brackets 93.

In order that the label grippers may apply a substantially uniform pressure against the bottles irrespective of slight variations in size, and to avoid the possibility of breakage of parts, I preferably arrange each arm 122 so that it will yield after the corresponding label gripper has engaged the bottle. For this purpose a flanged sleeve 128 (Fig. 6) and an arm 129 are rigidly secured to the lower end of each shaft 121 by means of a set screw 130 which extends through both the arm and the sleeve into engagement with the shaft. The arm 122 is pivotally mounted on the sleeve 128 between the arm 129 and the flange 132 at the lower end of the sleeve. An integral projection 133 extends at right angles from the end of the arm 122, and a coiled tension spring 134 connects this projection with the end of the arm 129. A set screw 136 extends through a lateral projection 137 on the arm 122 into contact with the arm 129 to limit the relative movement between these arms under the influence of the spring 134. It will be understood that when the label gripper is in contact with the bottle, the spring will be slightly elongated, and the set screw 136 will be slightly out of contact with the arm 129. No torque can be applied to the shaft 121 except through the spring.

It will be noted that the cam 126 and its associated parts are fully protected by the table 30 thereabove. With the construction which I have disclosed there is no necessity for slots or other openings in the table to accommodate the movement of the label grippers, as in prior arrangements. Hence, if a bottle is accidentally broken on the table, the pieces of glass cannot fall through into the cam mechanism and cause serious damage to the parts thereof.

After the labels have been applied to the bottle, and the pickers have moved out of the way, the rotation of the table carries the bottle between a pair of wipers 139 (Fig. 1) shown as arcuate shaped brushes mounted in a suitable supporting frame 140. These brushes wipe the adhesive coated ends of the labels against the bottle. No attempt has been made to illustrate the detailed construction of these wipers, since they may be of conventional form and are well known in this art.

As the labeled bottles reach a position near the conveyor chain 46, they are transferred from the table to the conveyor by a mechanism comprising a single hook-shaped member or device 142 which is moved over the surface of the table in synchronism with the rotation thereof, and which engages each bottle at the proper time and removes it from the table. The member 142 is pivoted to a rotatable head 144 by means of a pin 145. A second rotatable head 155 is mounted near the head 144 and carries a pin 159 which engages a slot or guideway 161 formed in a horizontal tail piece or extension 162 integral with the hook-shaped member 142. These parts are so constructed and arranged that the hook 142 is given a combined motion of translation and oscillation, and it engages each bottle at the proper time by reaching into the space bounded by the two forks 94, the bottle, and the post 95. If the bottle were in contact with the post, this would not of course be possible. The mechanism for actuating the hook 142 is more fully described and claimed in my said prior application, Serial No. 655,401.

A pair of vertically spaced arcuate guide rails 164 are preferably provided outside the path of the bottles as they are being transferred by the hook 142. These rails are preferably yieldably supported by mounting them on a vertical pivot pin 165 (Fig. 1) and providing a tension spring 166 to urge them against a suitable stop 168. In order to eliminate still further any shock to the bottles as they leave the table, I mount a finger 169 on the extremity of each guide rail. Each finger is pivoted to its guide rail and provided with a hook portion 170 which is yieldably held against the outer surface of the guide rail by means of a tension spring 171. These fingers 169 are located in different horizontal planes from the bracket forks 94, so that these parts cannot interfere. The ends of the fingers extend over the surface of the table and as close to the path of the bracket posts 95 as is practicable without interference. It will be apparent from an inspection of Fig. 1 that the curved extremities of the long inner prongs of the brackets perform an important function in directing the bottle outwardly toward the fingers 169. These fingers cooperate with the hook 142 in changing the direction of travel of the bottles without shock.

The operation of the invention will now be apparent from the above disclosure. The unlabeled bottles are placed upon the left end of the conveyor chain 46, which is traveling toward the feeding turret 58. These bottles may be in actual contact with one another, or they may be spaced at any intervals whatsoever. Whenever a bottle reaches the stop 69 at a time which would bring it to the turret at the wrong time with respect to the position of the turret hooks 59, the bottle will be arrested by the stop.

As a bottle reaches the turret 58, it will be engaged by one of the hooks 59, carried around thereby and placed on the table 30 directly in the path of a bracket 93. During this movement the bottle is clamped firmly against the turret by the yieldable guide rails 87. When the bottle is engaged by the bracket 93, it will be clamped thereagainst by one of the grip fingers 102, controlled by the cams 111. Shortly thereafter the adhesive coated labels will be applied to the front surface of the bottle by the pickers 114, as indicated in Fig. 9, and a label gripper 117 will immediately be brought into contact with the central portions of the labels by the action of the rollers 123 in following the cam groove 125. The pickers will thereupon withdraw, and the bottle will pass between the brushes 139, which will wipe down the ends of the labels.

When the labeled bottle reaches a position near the hook 142, the label gripper 117 will swing away from the bottle, and the hook 142 will immediately engage the bottle and transfer it from the table to the conveyor chain 46, which will carry it to any suitable receiving apparatus (not shown). The hook moves very fast while over the table, since it has to engage the rear surface of the bottle, which is traveling rapidly due to the rotatation of the table. Furthermore, the bottle must be withdrawn fast enough to prevent it from being struck by the outer prongs of the bracket forks 94. As the bottle reaches the conveyor, however, the hook slows up considerably, so that there is no tendency to hurl the bottle along the conveyor.

It will be apparent to those skilled in the art that the present machine is simpler, less costly to manufacture, and more effective in operation than any other machine heretofore produced for the same purpose. The bottles are firmly supported at all parts of the cycle, and they cannot be tipped over by any sudden stopping of the machine. The cam 126 and the parts associated therewith are well protected by the table thereabove. This table is not slotted (as in prior constructions) to accommodate the movement of the label grippers, and there are no openings through which broken glass could fall into the cam. The brackets 93 form a simple and effective support for the bottles, and by providing a space between the bottle and the post 95, they make it possible to use the simple hook member 142 for removal. Furthermore, with this bracket construction, the labels can be wrapped entirely around the bottle if desired by a suitable wrapping mechanism.

Having thus described my invention, what I claim as new and desire to secure by Letters Patent is:

1. A labeling machine comprising a rotary table arranged to support articles during the labeling operation, a plurality of vertical shafts extending through the table and rotatably supported therein, mechanism located beneath the table and arranged to oscillate the shafts relative to the table as the table rotates, and label grippers located above the table and actuated by the shafts.

2. A labeling machine comprising a rotary table arranged to support articles during the labeling operation, a plurality of vertical shafts extending through the table and rotatably supported therein, means including a stationary cam below the table arranged to oscillate the shafts relative to the table as the table rotates, an arm connected to each shaft above the table, and a label gripper carried by each of the upper arms.

3. A labeling machine comprising a rotary table arranged to support articles during the labeling operation, a plurality of vertical shafts extending through the table and rotatably supported therein, an arm connected to each shaft below the table, a stationary cam below the table, cam followers on the arms which are controlled by the cam, an arm connected to each shaft above the table, and a label gripper carried by each of the upper arms.

4. A labeling machine comprising a rotary table arranged to support articles during the labeling operation, a plurality of vertical shafts extending through the table and rotatably supported therein, a horizontal arm yieldably connected to each shaft below the table, a stationary cam below the table, cam followers on the arms which are controlled by the cam, a horizontal arm connected to each shaft above the table, and a substantially vertical label gripper mounted on the end of each the upper arms.

5. A labeling machine comprising a rotary table having a depressed central portion and an elevated outer portion, a plurality of vertical shafts extending through the depressed portion of the table and rotatably supported therein, an arm connected to each shaft below the table, a stationary cam below the table, cam followers on the arms which are controlled by the cam, a horizontal arm connected to each shaft above the table and arranged to swing close to the said depressed portion of the table, and a substantially vertical label gripper mounted on the end of each of the upper arms.

WALTER W. OSLUND.